Sept. 18, 1962  C. E. MEYERHOEFER  3,054,134
METERING APPLICATOR FOR FLUIDS
Filed Jan. 25, 1961

INVENTOR.
CARL E. MEYERHOEFER
BY *H. Lee Helms*

ATTORNEY

United States Patent Office 3,054,134
Patented Sept. 18, 1962

3,054,134
METERING APPLICATOR FOR FLUIDS
Carl E. Meyerhoefer, Little Neck, N.Y., assignor to Knomark, Inc., Brooklyn, N.Y., a corporation of New York
Filed Jan. 25, 1961, Ser. No. 96,634
3 Claims. (Cl. 15—566)

The object of the present invention is to provide a metering applicator for the dispensing of measured, predetermined amounts of liquids, such as shoe polish, ink, paste, lotions, water emulsion paints and the like.

Previously attempted solutions consisted either of an applicator to be dipped into the liquid or the liquid being dispensed from a squeeze bottle by hand pressure. With neither of these methods was it possible to control or limit the amount of liquid being dispensed. As a result, unless the user was skilled, a rather messy job resulted.

An object of the invention is to provide a device with which the amount to be dispensed is predetermined and which requires no skill or manual dexterity on the part of the user.

Another object of the invention is to provide an applicator which will automatically seal the contents of the container to which it is attached from contact with the atmosphere when the device is not in use.

The invention will be described with respect to the accompanying drawings, in which.

Figure 2:
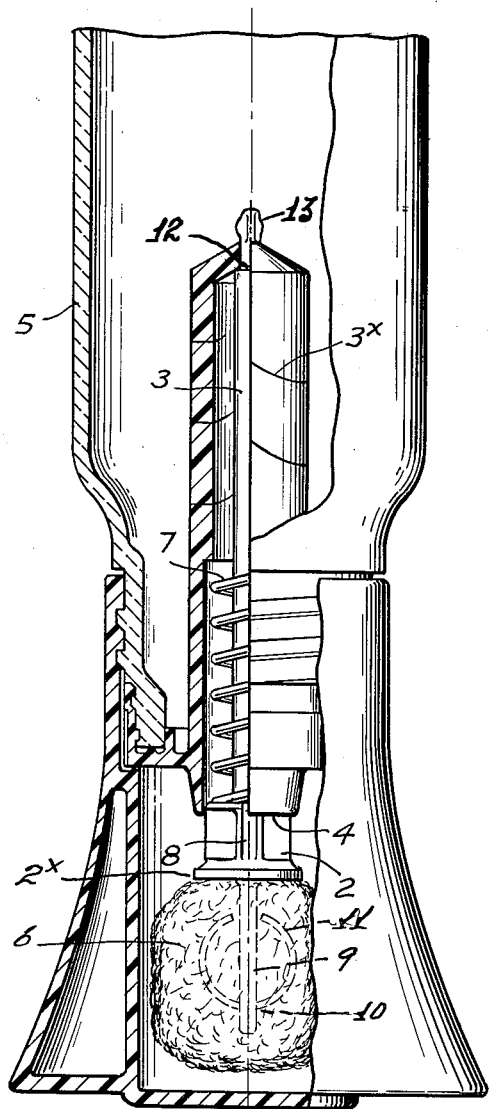
FIG. 2 is a longitudinal section through a container with an embodiment of the invention applied thereto.
Figure 3:
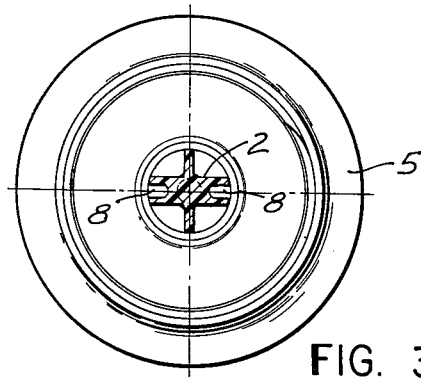
FIG. 3 is a transverse section, taken on the line 2—2, FIG. 1.

The applicator assembly embodies a metering tube normally closed at one end and normally open at the other. A valve head 2 is carried by a rod or stem 3, the head being engaged by a spring 7, the stem being operatively connected to the closed end of the metering tube, as by a shoulder at 12 and an abutment at 13. The valve head is positioned in normally open relationship with respect to the open end of the metering tube as shown in FIG. 2. The metering tube preferably is an integral part of a suitable closure cap 4 for assembly to a container 5 containing the liquid to be dispensed. The metering tube, cap, stem and closure are preferably made of molded polyethylene to resist chemical reaction with the ingredients of certain liquid mixtures, and the metering tube is provided with a spiral cut, indicated at $3^x$, which is adapted to make it a spring-like member, when the material of which it is made is adapted for that action.

Figure 1:
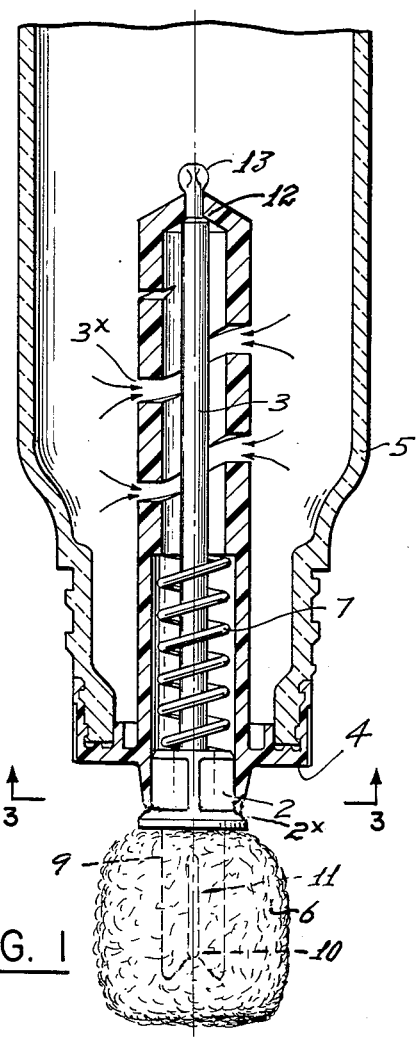
FIG. 1 is a similar view showing communication between fluid in the bottle and the metering tube when the applicator head is pressed down.

A suitable applicator head 6 of lambs wool, sponge, or the like is secured to the stem adjacent to the closure valve to receive and hold the liquid dispensed from the metering tube via discharge apertures at 8. In the embodiment illustrated the valve head 2 is formed with a flanged and beveled (frusto-conical) base $2^x$ from which depends an extension 9, shown by dotted lines in FIG. 1. The extension 9 is apertured at 10 to receive a stiff wire 11 which is passed through the applicator head, and the ends of the wire are normally bent under the lower end of the valve head extension 9. When the valve head 2 and its stem 3 are integrally molded of polyethylene, which is the preferred material, the "abutment" at 13 may be formed by fusing the uppermost transversely reduced end area of the rod or stem, after it is projected through the top of the metering tube 3, in assembling the parts, thus forming an enlargement.

To use the applicator, it is held in hand inverted position, with the applicator head pointing downward. The application of pressure upon the applicator head will close the valve at the discharge end of the metering tube, while at the same time the latter will be expanding to open it along the spiral cut. Liquid will enter the metering tube and fill its cavity. Release of the applicator head will allow the metering tube to close and will open the valve at the discharge end of the tube. The liquid previously captured within the metering tube is now permitted to flow out of the tube through the ports 8, and the liquid is absorbed by the material of the applicator head, from whence it may be transferred to a shoe when the liquid is shoe polish, or to any desired surface, by a light rubbing or brushing motion, the force required being less than that for opening the metering tube.

Having described my invention, what I claim and desire to secure by Letters Patent, is as follows:

1. A metering applicator for fluids comprising a hollow tubular body open at one end and having an annular outwardly extending flange at said open end area followed by a chamber inwardly restricted by a shoulder, a passageway leading beyond said shoulder to the opposite and normally closed end area of the tubular body, a spiral cut extending in and longitudinally of the wall of said passageway and permitting expansion and contraction of the tubular body along said spiral cut, a rod extending through said tubular body and having its inner end connected to said normally closed end of the tubular body, a valve head at the outer end of the rod, a spring within said chamber, one end of the spring engaging said shoulder and one end engaging said valve head to normally maintain the latter in open position relatively to the open of the tubular body and to normally maintain the walls of the spiral cut in closed relation, and a projection on and outwardly of the valve head adapted to carry a fluid applicator, adapted upon pressure upon said projection to act upon the valve head to move the same to closed position with simultaneous movement of the rod to expand the wall of the spiral cut for admission of fluid into the hollow tubular body.

2. A metering valve assembly for fluid containers comprising a plastic tube having a closed top and a normally open base, the tube being formed with a spring-receiving chamber having a shoulder at its upper end, and the tube having a spirally cut area beyond said chamber, a valve head adapted for sliding movement in said chamber, a stem carried by the valve head, and a spring encircling the stem, the valve head being channeled above its base for outflow of fluid and its base being adapted to close the tube by abutting the latter, the upper end of the stem being connected to the top of the tube, and the spring normally acting upon the valve head and stem to hold the head in open position and the tube unexpanded with its spirally cut wall area closed.

3. A metering applicator for fluids constructed in accordance with claim 2, in which the hollow tubular body is made of molded plastic and the valve head is slidingly movable within the tube, the spring surrounding the valve stem, one end of the spring engaging the valve head and the opposite end engaging the tube outwardly of the spirally formed area thereof, the stem having an end passed through an aperture in the top of the tube a shoulder on the stem abutting the inner wall of the tube top, and the stem carrying an abutment at the outer wall of the tube top.

References Cited in the file of this patent
UNITED STATES PATENTS

| | | |
|---|---|---|
| 1,253,032 | Hardin | Jan. 8, 1918 |
| 1,642,868 | Booty | Sept. 20, 1927 |
| 1,796,086 | Davis | March 10, 1931 |
| 2,446,085 | Gronmeyer et al. | July 27, 1948 |